United States Patent [19]
Das et al.

[11] Patent Number: 4,618,984
[45] Date of Patent: Oct. 21, 1986

[54] ADAPTIVE AUTOMATIC DISCRETE UTTERANCE RECOGNITION

[75] Inventors: Subrata K. Das, Granite Springs; Norman R. Dixon, Katonah, both of N.Y.

[73] Assignee: International Business Machines Corporation, Armonk, N.Y.

[21] Appl. No.: 502,415

[22] Filed: Jun. 8, 1983

[51] Int. Cl.$^4$ ............................................. G10L 5/00
[52] U.S. Cl. .................................................... 381/43
[58] Field of Search .................................. 381/41–49; 364/513, 513.5

[56] References Cited

U.S. PATENT DOCUMENTS

| | | | |
|---|---|---|---|
| 3,333,248 | 7/1967 | Greenberg et al. | 340/172.5 |
| 3,369,077 | 2/1968 | French | 179/1 |
| 3,440,617 | 4/1969 | Lesti | 340/172.5 |
| 3,665,450 | 5/1972 | Leban | 340/324 A |
| 3,718,768 | 2/1973 | Abramson et al. | 179/15 BA |
| 4,069,393 | 1/1978 | Martin et al. | 179/1 SD |
| 4,092,493 | 5/1978 | Rabiner et al. | 179/1 D |
| 4,297,528 | 10/1981 | Beno | 179/1 B |

FOREIGN PATENT DOCUMENTS

A2945377  5/1980  Fed. Rep. of Germany .
A2098773  11/1982  United Kingdom .

OTHER PUBLICATIONS

C. C. Tappert, "A Preliminary Investigation of Adaptive Control in the Interaction Between Segmentation and Segment Classification in Automatic Recognition of Continuous Speech," IEEE Trans. on Systems, Man, and Cybernetics, vol. SMC2, No. 1, 1/72, pp. 66–72.

C. C. Tappert et al., "Application of Sequential Decoding for Converting Phoenetic to Graphic Representation in Automatic Recognition of Continuous Speech (ARCS)," IEEE Trans. on Audio and Electroacoustics, vol. Au–21, No. 3, 6/73, pp. 225–228.

Proceedings of the Fourth International Joint Conference on Pattern Recognition, Nov. 7th–10th 1978, Kyoto, JP, pp. 985–989, IEEE, New York, US; Sei–ichi Nakagawa et al.: "A Real Time Spoken Word Recognition System in a Large Vocabulary with Learning Capability of Speaker Differences".

Primary Examiner—E. S. Matt Kemeny
Attorney, Agent, or Firm—Carl C. Kling

[57] ABSTRACT

Adaptive training of a system for discrete utterance recognition during continuous speech permits single prototype utterances to be adapted to the needs of the talker, during operation, without tedious multiple recitation for training of prototypes. Initial training of the recognition system is by a single utterance (or simulation) of a prototype vocabulary. Operation proceeds, so long as utterances are recognized, until an unrecognized utterance is detected. The system then prompts a choice of prototype vocabulary keyword candidates, which the talker may then choose and utter. The system calculates three recognition distance values as follows:

D1—unrecognized utterance vs. prototype vocabulary keyboard candidate

D2—prototype vs. prototype vocabulary keyword candidate

D3—prototype vs. unrecognized utterance.

The system reviews the recognition distance values, and from this review determines whether to retry (when D1<D2=NO of D1<D3=NO) or to replace the prototype by the prototype vocabulary keyword candidate (when D1<D2=YES and D1<D3=YES).

4 Claims, 2 Drawing Figures

ADAPTIVE AUTOMATIC DISCRETE UTTERANCE RECOGNITION

BACKGROUND OF THE INVENTION

1. Field of the Invention

This invention relates to automatic discrete utterance voice recognition systems, and particularly relates to an adaptive automatic discrete utterance recognition system which requires only a prototype vocabulary set to be established by multiple repetition techniques and permits subsequent talkers to interact with the voice recognition system in adaptive mode in which mode the new talker is required merely to retrain the system for that limited subset of the vocabulary set in which the system cannot perform recognition.

2. Description of the Prior Art

Extant automatic discrete utterance voice recognition systems involve separate procedures for utterance prototype establishment in which multiple repetitions of each vocabulary item are taken from each talker. If a single repetition is taken the probability exists that the entire vocabulary prototype set will require re-establishment if an inappropriate prototype representation occurs.

Typical of such procedures—each talker repeating the prototype word list—are the following:

U.S. Pat. No. 3,333,248, Greenberg et al, SELF-ADAPTIVE SYSTEMS, July 25, 1967. Greenberg et al shows a self-adaptive pattern recognizer which, after initial training, may be switched to the operate mode and remains in operate mode until a character is presented which results in a reject signal. At this time the operator must assist by placing the identification switch in the position which corresponds to the rejected pattern, and the operator must determine whether the rejected pattern is a slightly modified one of the initial sample patterns or a new sample pattern and must set the appropriate switches including the switch to begin the training mode. In order to effectively update the self-adaptive circuit, a sufficient number of the initial sample patterns must be stored and represented to the self-adaptive circuit along with the rejected pattern.

U.S. Pat. No. 3,369,077, French et al, PITCH MODIFICATION OF AUDIO WAVEFORMS, Feb. 13, 1968. French et al shows a speech synthesizing system wherein pitch periods are adjusted according to a predetermined time base.

U.S. Pat. No. 3,440,617, Lesti et al, SIGNAL RESPONSIVE SYSTEMS, Apr. 22, 1969. Lesti et al shows a technique for recognition, independent of amplitude and duration of the signals to be recognized, by segmenting the signal into a series of component signals. The system extrapolates and interpolates inputs which it has never before received to the response which most closely resembles the signal. Data might be lost when it becomes replaced by new data. Lesti et al shows a technique in which newly coded samples are not discarded when the transmit buffer portion is already full but rather the oldest untransmitted coded sample is discarded to make room for storage of the new sample.

U.S. Pat. No. 3,665,450, Leban, METHOD AND MEANS FOR ENCODING AND DECODING IDEOGRAPHIC CHARACTERS, May 23, 1972. Leban shows a technique for handling ideographic characters.

U.S. Pat. No. 3,718,768, Abramson et al, VOICE OR ANALOG COMMUNICATION SYSTEM EMPLOYING ADAPTIVE ENCODING TECHNIQUES, Feb. 27, 1973. Abramson et al shows a technique for transmitting communications to remote stations which can detect their own identification signals and have their own sampling rates.

U.S. Pat. No. 4,069,393, Martin et al, WORD RECOGNITION APPARATUS AND METHOD, Jan. 17, 1978. Martin et al shows a technique for time normalizing training words and words for recognition. Martin et al deals with spoken input training words and generates a correlation function, and with feature extraction. During the training mode, the equipment is trained with new vocabulary words, preferably spoken by the person who is to later use the machine. It is desirable to use multiple samples of the same training word to obtain a faithful average sample.

U.S. Pat. No. 4,092,493, Rabiner et al, SPEECH RECOGNITION SYSTEM, May 30, 1978. Rabiner et al shows a speech recognition system in which test signals are time aligned to the average voiced interval of repetitions of each speech segment having a previously generated voiced interval linear prediction characteristic.

U.S. Pat. No. 4,297,528, Beno, TRAINING CIRCUIT FOR AUDIO SIGNAL RECOGNITION COMPUTER, Oct. 27, 1981. Beno shows a training circuit technique in which each training pattern, to be accepted for merging, must match the previously merged patterns by a threshold amount. The threshold is automatically varied as the number of previously merged training patterns increases.

C. C. Tappert, A PRELIMINARY INVESTIGATION OF ADAPTIVE CONTROL IN THE INTERACTION BETWEEN SEGMENTATION AND SEGMENT CLASSIFICATION IN AUTOMATIC RECOGNITION OF CONTINUOUS SPEECH, IEEE Trans. on Systems, Man, and Cybernetics, Vol. SMC2, No. 1, 1/72, pp. 6672. Tappert shows feedback control of the interaction of segmentation and segment classification in continuous speech recognition.

C. C. Tappert, et al, APPLICATION OF SEQUENTIAL DECODING FOR CONVERTING PHONETIC TO GRAPHIC REPRESENTATION IN AUTOMATIC RECOGNITION OF CONTINUOUS SPEECH (ARCS), IEEE Trans. on Audio and Electroacoustics, Vol. Au-21, No. 3, 6/73, pp. 225228. Tappert et al shows conversion of machine-contaminated phonetic descriptions of speaker performance into standard orthography. Distinction is made between speaker-and-machine-dependent corruption of phonetic input strings.

SUMMARY OF THE INVENTION

The invention provides an optimum technique for prototype establishment involving merely an initial single prototype statement of each vocabulary item (from the first talker or electronic equivalent) and thereafter requiring no recitation of vocabulary items by either the first or subsequent talkers—except for those vocabulary items in which the system has difficulty performing correct recognition. Retraining for such misrecognized vocabulary items is integrated with the recognition procedure.

The object of the invention is to provide inexpensive, fast, unobtrusive adaptation of a speech recognition system for the special requirements of each talker.

Another object of the invention is that the talker should not be very aware that the system is being retrained.

Another object of the invention is for the system to provide prompts to lead the talker through the limited subset of the vocabulary prototype set in as unobtrusive a manner as possible and within the talker's context.

Another object of the invention is to provide system retraining only for that limited subset of the vocabulary prototype set in which both of the following occur:
(1) the talker utters a word from the prototype set; and
(2) the system has difficulty performing recognition of the word spoken.

This permits the system to avoid retraining for those words which are not used.

DESCRIPTION OF THE PREFERRED EMBODIMENT

Figure 1:
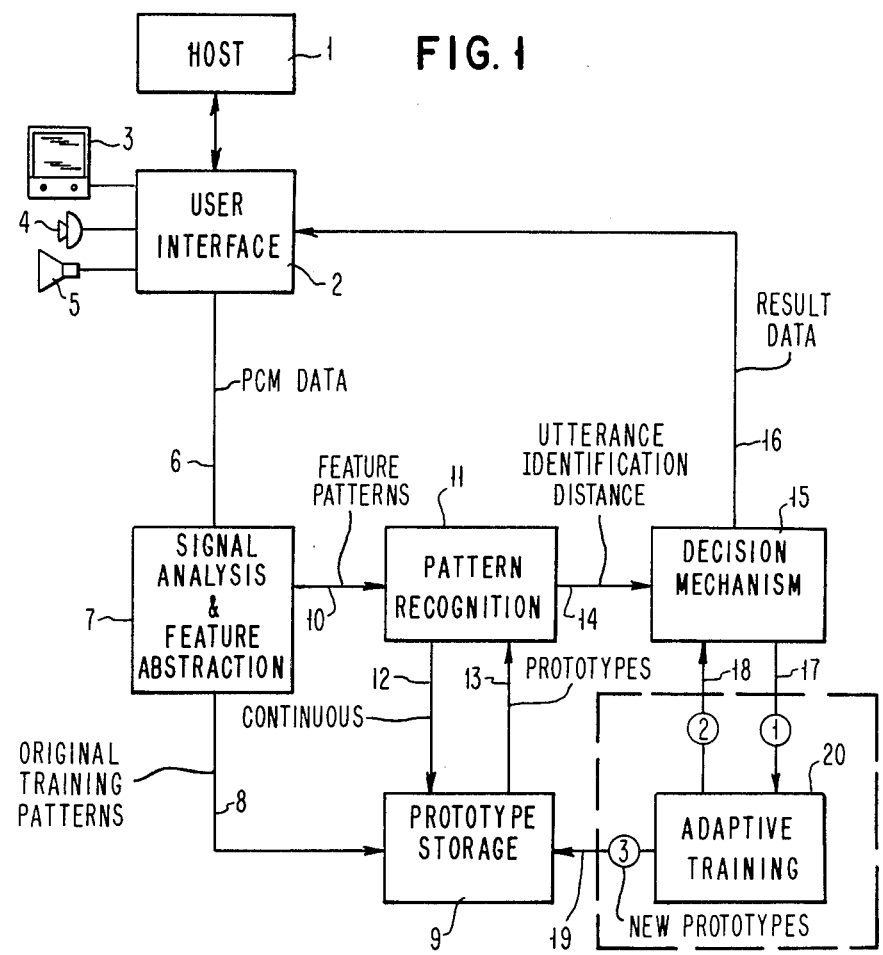
FIG. 1 is a block diagram of the adaptive automatic discrete utterance recognition system of the invention. Of the system shown, the portion of FIG. 1 most significant to the invention is the subsystem box marked "Adaptive Training."

FIG. 1 is a block diagram of the adaptive automatic discrete utterance recognition system of the invention. Note that prior art voice recognition systems generally require each new talker to provide a multiple recitation of the prototype vocabulary for subsequent recognition. If for any reason a talker needed to change the prototype vocabulary (e.g., if the talker developed a respiratory problem) the original procedure required repetition in its entirety. This invention eliminates, even for the first talker, the need for multiple recitation of the prototype vocabulary, and eliminates the need for any recitation at all of the entire prototype vocabulary by any talker. Only if the system should have difficulty performing recognition of any individual vocabulary item is the talker prompted to utter that individual vocabulary item.

The method of this invention requires the following operational modes:

Mode 1 Initializing Mode

A selected prototypical talker recites one prototype vocabulary keyword utterance for each of a prototype set of vocabulary items, the system converting each prototype vocabulary keyword utterance to a code pattern for subsequent use in recognition procedures. Where appropriate, a prototype set may be calculated and entered in coded form without any recitation by any talker at all.

Mode 2 Normal Operation Mode

A talker (which talker may be the prototypical talker or a subsequent talker) provides voice input for recognition by the system so long as recognition proceeds satisfactorily. (Under conditions not including consistent recognition errors no further vocabulary training occurs.)

Mode 3 Adaptive Retraining Mode

Upon conditions of consistent recognition error for a sample vocabulary item, the system prompts the talker as required for adaptive retraining.

Details of the method will be subsequently discussed under the heading "INVENTIVE METHOD."

DETAILED DESCRIPTION OF THE DRAWINGS

FIG. 1 shows the adaptive automatic discrete utterance recognition system of the invention. Host computer 1 is connected to user interface 2, which in turn connects to display unit 3, microphone 4 and loudspeaker 5. User interface 2 provides the proper interface for the user and the recognition system, which may take a number of forms such as that shown. In the form shown in FIG. 1, user data passes via line 6 to signal analysis and feature abstraction unit 7 for distribution of original training patterns (prototypes) along pathway 8 to prototype storage 9 during training mode—and during recognition mode, feature patterns pass along pathway 10 to pattern recognition unit 11. Information of a control nature passes between pattern recognition unit 11 and prototype storage 9 via pathway 12; prototype patterns for recognition are supplied to pattern recognition mechanism 11 along pathway 13. Recognition information, in the form of utterance identification distance values, is provided via pathway 14 to decision mechanism 15. Recognition result data passes via pathway 16 back to user interface 2 for action.

Decision information also passes between decision mechanism 15 and adaptive training unit 20 via pathways 17 and 18, and from adaptive training unit 16 to prototype storage 9 via pathway 19. As previously pointed out, the portion of FIG. 1 most significant to the invention is the subsystem (identified by reference character 20) marked "Adaptive Training." Nodes (1), (2) and (3) are shown in FIG. 1 for ease in relating FIG. 1 with FIG. 2.

Figure 2:
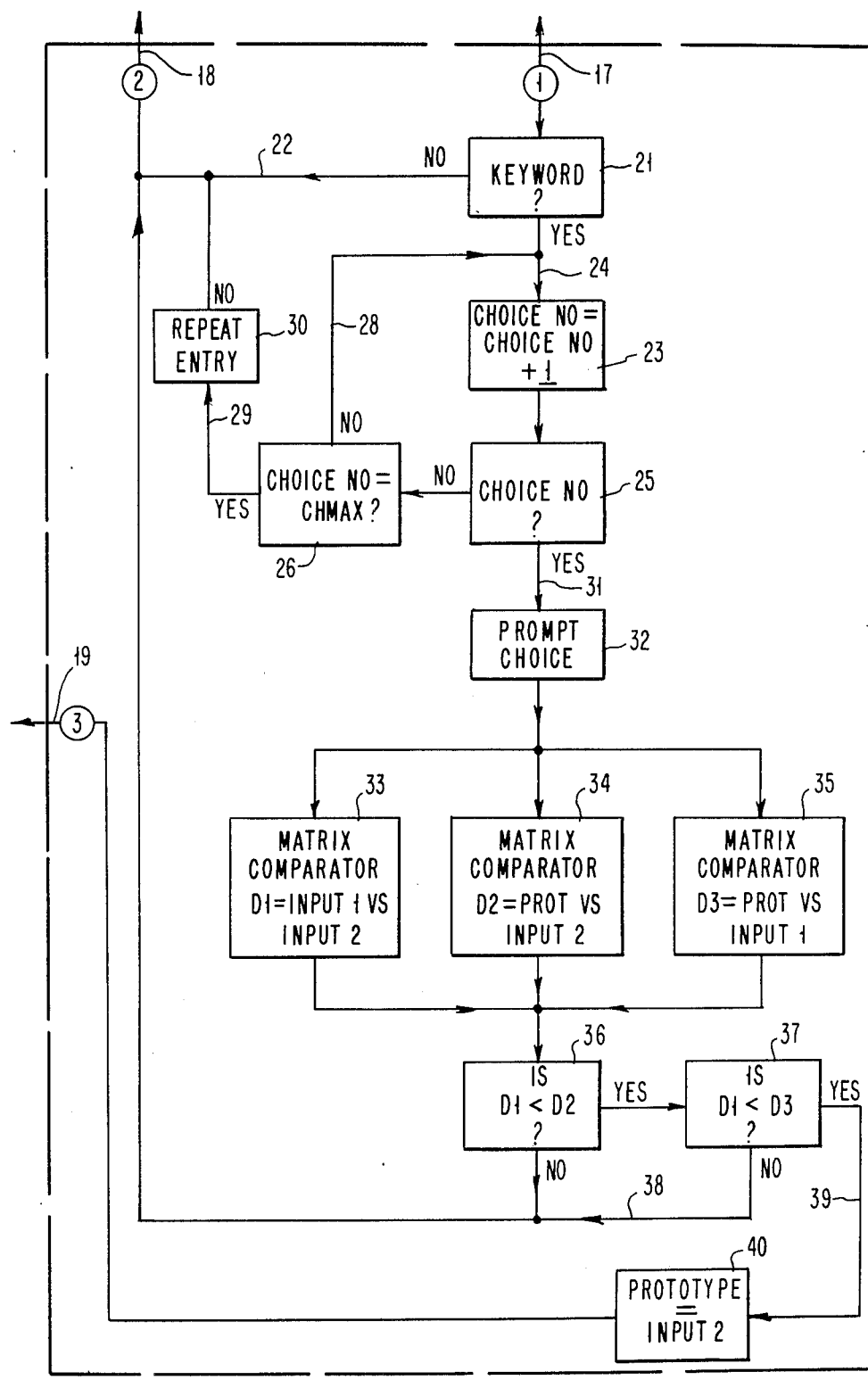
FIG. 2 is a detailed diagram of the Adaptive Training subsystem.

FIG. 2 is a detailed diagram of the Adaptive Training subsystem 20 of FIG. 1. Keyword unit 21 determines whether or not the utterance is a keyword. If "no," a notification is forwarded via pathway 22 to node (2), which connects to pathway 18 in both FIGS. 1 and 2. If "yes,38 a notification is forwarded to incrementer 23 via "YES" line 24 to prompt a user identification of the keyword by a sequence of choice numbers. Incrementer 23 increments the current keyword choice number and provides the next choice number to mechanism 25 for determination whether the keyword choice number is equal to the current choice. If the choice number is not the appropriate choice number, the choice prompts continue by a signal to maximum identification mechanism 26 (CHOICE NO=CHMAX?) for continuing through the list of choices. If the choice number is less than maximum, a signal on "NO38 pathway 28 controls a prompt for the next choice number. When the last choice number is reached, CHOICE NO=CHMAX box 26 signals "YES" via pathway 29 to invoke REPEAT ENTRY mechanism 30 for a new list of choices.

Once the utterance choice number is determined, as identified by "YES" pathway 31 to PROMPT CHOICE box 32, the user is provided with a prompt requesting that the user make the utterance of choice. This utterance is the utterance to be used in certain situations as the new prototype.

The utterance is processed according to the processing technique selected for the utterance recognition system, and coded as utterance code INPUT 1. The prompt requires a second utterance, which is processed and coded as utterance code INPUT 2. These utterance code inputs are provided, along with a similarly coded prototype utterance, to three matrix comparators 33, 34 and 35, which make distance comparisons for the three codes. Matrix comparator 33 provides distance code D1 relating the two new input utterances to each other. Matrix comparator 34 provides distance code D2 relating the prototype and the second new input utterance to each other. Matrix comparator 35 provides distance code D3 relating the prototype and the first new input utterance to each other. The distance codes are compared by comparators 36 and 37. The function desired is to replace the prototype utterance by the utterance INPUT 2 where it is determined that INPUT 1 and INPUT 2 differ less from each other than they do from the prototype. If comparator 36 determines that INPUT 2 is closer to the prototype than to INPUT 1 (D1 is NOT less than D2) then mechanism 36 transmits on "NO" pathway 38 to Node (2) in FIG. 1, signalling the decision mechanism to go on without altering the prototype. Similarly, if comparator 37 determines that INPUT 1 is closer to the prototype than to INPUT 2 (D1 is NOT less than D3) then mechanism 37 transmits on "NO" line 38 to Node (2) in FIG. 1, signalling the decision mechanism to go on without altering the prototype.

The function desired is to alter the prototype when D1 is less than D2 and D1 is also less than D3. Comparator 37 provides a "YES" output on line 39 to initiate PROTOTYPE=INPUT 2 action from mechanism 40. Signal line 19 at Node (3) in FIG. 1 controls the action of replacing the prototype vocabulary entry with INPUT 2.

This adaptive replacement of the prototype vocabulary entry as a function of the determination that the new utterance is acceptable permits a prototype vocabulary to be established once, then used insofar as acceptable, with unobtrusive adaptive alteration of a limited number of vocabulary words as they appear in the context of normal operation. When the prototype word is misrecognized for any reason (dialect, pronunciation or other difference between speakers—or change in delivery by the same talker), this system identifies the misrecognition, prompts a twin input of the utterance, compares the inputs to each other and to the prototype, and in the situation where it is determined that the inputs fulfill the criteria, replace the prototype with one of the new inputs.

FIG. 2 details the procedures for adaptive retraining of prototype vocabulary items. During the recognition process if the talker produces a keyword mistake the adaptive retraining routine is invoked. Under computer control the procedures are entered and a stack of vocabulary item choices—related to the words just before the keyword mistake recognition—is sent to the adaptive training stage. Using this stack the system prompts the user to indicate which stack vocabulary item was uttered just prior to its identification as an unrecognized utterance. (This prompting can either be by audio response or character display from a gas panel, cathode ray tube, or the like.) If the word equivalent to the misrecognized utterance is not contained in the stack, the user is prompted to recite the utterance again, and the recognition procedure continues. Upon acknowledgment by the talker that a stack vocabulary item matches the utterance (INPUT 1), the user is prompted to provide a new prototype keyword candidate (INPUT 2) appropriate to that vocabulary item. The system calculates the matrix distances [INPUT 1 vs. INPUT 2=(D1)], [PROTOTYPE vs. INPUT 2=(D2)], and [PROTOTYPE vs. INPUT 1=(D3)], where INPUT 1 is the misrecognized utterance and INPUT 2 is the prompted utterance of the same keyword. If D1 is less than D2, and if D1 is less than D3, then INPUT 2 becomes the new prototype keyword. Otherwise the old prototype is retained. This procedure guarantees the best currently available prototype relative to the current user's (the user's current) speech characteristics. This procedure is independent of the mode of determining the particular matrix distance characteristics employed in the recognition process.

INVENTIVE METHOD

The following steps are followed:
1. Prototypical talker recites the keyword set, which keyword set is stored in coded form as the prototype vocabulary keyword set. Alternatively, the prototype vocabulary keyword set may be calculated and stored.
2. A subsequent talker utters a sample keyword for recognition.
3. If recognition occurs, proceed.
4. If recognition fails, enter adaptive retraining routine.
5. Set adaptive training stage with stack of recognition choice words related to the misrecognized keyword.
6. Prompt user to indicate which word of the stack was intended.
7. Check whether misrecognized keyword is in stack.
8. If 7 is negative, prompt talker to repeat misrecognized keyword.
9. Proceed with recognition procedure.
10. If 7 is positive, prompt talker to utter a new prototype candidate.
11. Calculate matrix distances:
INPUT 1 vs. INPUT 2=(D1)
PROT vs. INPUT 2=(D2).
PROT vs. INPUT 1=(D3), 12. Compare D1, D2, D3.
13. If D1<D2 AND D1<D3, then select INPUT 2 as new prototype and proceed.

The inventive method may be performed according to a number of variations without departing from the spirit and scope of the adaptive automatic discrete utterance recognition technique of this patent specification as pointed out in the following claims.

What is claimed is:
1. A method of adaptive automatic discrete utterance recognition comprising:
  (a) providing the system with a single utterance set of prototype vocabulary keywords;
  (b) operating the system until a misrecognized utterance is detected;
  (c) prompting a prompted prototype vocabulary keyword candidate utterance;
  (d) calculating recognition distances for the unrecognized utterance, the prompted prototype vocabulary keyword candidate utterance, and the prototype vocabulary keyword;
  (e) comparing the calculated recognition distances; and
  (f) selectively accepting as prototype vocabulary keyword the prototype vocabulary keyword candidate utterance as a function of said step of comparing the calculated recognition distances.
2. A method for adaptive automatic discrete utterance voice recognition, characterized by the following steps:

(a) providing a single recitation prototype vocabulary keyword set containing a multiplicity of coded prototype vocabulary items;

(b) providing the prototype vocabulary keyword set for use by a subsequent talker;

(c) proceeding by carrying out a sequence of vocabulary item recognitions until a recognition difficulty occurs on a particular vocabulary item utterance, which may be termed misrecognized utterance;

(d) commencing a retraining routine by which the system prompts the talker to retrain the system by carrying out the following retraining steps:

(1) isolating a stack of prototype vocabulary keywords appropriate to the misrecognized utterance;

(2) prompting the talker to choose a prototype vocabulary keyword from such stack of prototype vocabulary keywords;

(3) prompting the talker to provide a prompted prototype vocabulary keyword associated with the accepted choice, as a prototype vocabulary keyword candidate utterance;

(4) calculating distance relationships for the difference distance D1 between the misrecognized utterance and the prompted prototype vocabulary keyword candidate utterance, for the difference distance D2 between the prompted prototype vocabulary keyword candidate utterance and the prototype vocabulary keyword, and for the difference distance D3 between the misrecognized utterance and the prototype vocabulary keyword;

(5) comparing the difference distances D1, D2 and D3 calculated in said calculating distance relationships step; and (6) selectively replacing the chosen prototype vocabulary keyword as a function of the result of said comparing the difference distances step; and (e) returning to proceeding step (c).

3. The method of claim 2, further characterized in that said comparing the difference distances step (i) makes comparisons D1<D2? and D1<D3?, and further characterized in that said selectively replacing the selected prototype vocabulary keyword step (j) is operative upon either negative result to return to step (d), and is operative upon positive result for both comparisons to activate replacement of the prototype vocabulary keyword by the coded equivalent of the prompted prototype vocabulary keyword candidate.

4. A system for speech recognition having operating means to recognize, during normal operation mode, utterances by a talker in accordance with a prototype vocabulary keyword set, characterized by (a) initializing mode control means operative during a first prototype vocabulary keyword initializing operation to establish as a criterion for recognition the coded equivalent of the prototype keyword utterance as a prototype vocabulary keyword;

(b) mode control means operative during normal operation mode to identify a misrecognized utterance situation and cause mode transfer to adaptive retraining mode; and (c) adaptive retraining mode control means operative to control, in sequence, the following:

(1) means to inform the talker of a list of utterance choices for acceptance or rejection by the talker;

(2) means responsive to the talker's rejection or acceptance respectively to inform the talker of a new list of choices, and repeat steps 1 and 2 until all lists are exhausted, or to proceed in retraining mode;

(3) retraining mode means effective to prompt talker to utter the keyword associated with the accepted choice, as a prototype vocabulary keyword candidate utterance.

* * * * *